(12) United States Patent
Seto et al.

(10) Patent No.: US 10,704,976 B2
(45) Date of Patent: Jul. 7, 2020

(54) PRESSURE SENSOR

(71) Applicant: AZBIL CORPORATION, Chiyoda-ku (JP)

(72) Inventors: Yuki Seto, Chiyoda-ku (JP); Masayuki Yoneda, Chiyoda-ku (JP); Yoshiyuki Ishikura, Chiyoda-ku (JP); Tomohisa Tokuda, Chiyoda-ku (JP); Rina Ogasawara, Chiyoda-ku (JP)

(73) Assignee: AZBIL CORPORATION, Chiyoda-ku (JP)

( * ) Notice: Subject to any disclaimer, the term of this patent is extended or adjusted under 35 U.S.C. 154(b) by 143 days.

(21) Appl. No.: 16/066,565

(22) PCT Filed: Dec. 15, 2016

(86) PCT No.: PCT/JP2016/087346
§ 371 (c)(1),
(2) Date: Jun. 27, 2018

(87) PCT Pub. No.: WO2017/115660
PCT Pub. Date: Jul. 6, 2017

(65) Prior Publication Data
US 2019/0003910 A1 Jan. 3, 2019

(30) Foreign Application Priority Data
Dec. 28, 2015 (JP) ................. 2015-256377

(51) Int. Cl.
*G01L 9/00* (2006.01)
*G01L 7/08* (2006.01)
*G01L 1/22* (2006.01)

(52) U.S. Cl.
CPC ............ *G01L 9/0054* (2013.01); *G01L 7/082* (2013.01); *G01L 1/2218* (2013.01); *G01L 2009/0069* (2013.01)

(58) Field of Classification Search
CPC ..... G01L 9/0054; G01L 7/082; G01L 1/2218; G01L 2009/0069; G01L 17/00; G01L 19/00; G01P 15/0802
See application file for complete search history.

(56) References Cited

U.S. PATENT DOCUMENTS 5,872,315 A  2/1999 Nagase et al.
6,062,088 A  5/2000 Ingrisch et al.
(Continued)

FOREIGN PATENT DOCUMENTS

DE  10 2013 209 385 A1  11/2014
DE  10 2014 118 850 A1  6/2016
(Continued)

OTHER PUBLICATIONS

International Search Report dated Feb. 28, 2017, in PCT/JP2016/087346, filed Dec. 15, 2016.
(Continued)

*Primary Examiner* — Suman K Nath
(74) *Attorney, Agent, or Firm* — Oblon, McClelland, Maier & Neustadt, L.L.P.

(57) ABSTRACT

A pressure sensor according to the present invention includes a diaphragm (3) including a first principal surface (3A) and a second principal surface (3B) that is opposite thereto, the first principal surface receiving a pressure of a fluid; a semiconductor chip (1) provided with resistors that constitute a strain gauge; and at least three support members (2a, 2b, 2c) made of an insulating material, each support member being fixed to the second principal surface at one end thereof and to the semiconductor chip at the other end thereof and extending perpendicularly to the second principal surface so as to support the semiconductor chip. One of the support members (2a) is provided at a center (30) of the diaphragm in plan view. At least two of the other support members (2b, 2c) are provided at positions point-symmetri- (Continued)

cal about the center of the diaphragm in plan view in a region in which the diaphragm is deformed when a pressure greater than a pressure applied to the second principal surface is applied to the first principal surface.

7 Claims, 9 Drawing Sheets

(56) References Cited

U.S. PATENT DOCUMENTS

2011/0303023 A1* 12/2011 Becher ............... G01L 19/0046
 73/862.581
2013/0305834 A1  11/2013  Brode et al.

FOREIGN PATENT DOCUMENTS

| EP | 1 876 434 A2 | 1/2008 |
| JP | 1988-217671 A | 9/1986 |
| JP | 63-217671 A | 9/1988 |
| JP | 9-232595 A | 9/1997 |
| JP | 2000-508425 A | 7/2000 |
| JP | 2004-45140 A | 2/2004 |

OTHER PUBLICATIONS

Office Action dated Mar. 27, 2019 in corresponding Japanese Patent Application No. 2015-256377 (with English Translation), 8 pages.

* cited by examiner

PRESSURE SENSOR

TECHNICAL FIELD

The present invention relates to pressure sensors, and more particularly to a sanitary pressure sensor.

BACKGROUND ART

In general, sanitary pressure sensors used in, for example, facilities for manufacturing food, medical supplies, etc., which require sanitary care, are expected to satisfy strict requirements regarding, for example, corrosion resistance, cleanliness, reliability, and versatility.

For example, to satisfy the requirements regarding corrosion resistance, a liquid contact portion of a sanitary pressure sensor that comes into contact with fluid (for example, liquid) to be subjected to pressure measurement needs to be made of a highly corrosion-resistant material, such as a stainless steel (SUS), a ceramic, or titanium. In addition, to satisfy the requirements regarding cleanliness, the sanitary pressure sensor needs to have a flush diaphragm structure that enables easy cleaning and to be highly thermal-shock resistant to withstand steam washing. In addition, to satisfy the requirements regarding reliability, the sanitary pressure sensor needs to have an encapsulant-free structure (oil-free structure) and a structure in which a diaphragm does not easily break (high rigidity barrier). In addition, to satisfy the requirements regarding versatility, a connecting portion of the sanitary pressure sensor to be connected to a pipe through which the fluid that serves as a measurement object flows needs to have the shape of a coupling.

As described above, the material and structure of the sanitary pressure sensor are more strictly limited than those of other pressure sensors, and therefore the sensitivity of the sanitary pressure sensor cannot be easily increased. For example, when the film thickness of the diaphragm is increased (aspect ratio of diameter to thickness of the diaphragm is reduced) to realize a structure in which the diaphragm does not easily break, the amount of deformation of the diaphragm is reduced, and the sensitivity of the sensor is reduced accordingly. Therefore, a technology for accurately detecting a small amount of deformation of the diaphragm in the sanitary pressure sensor is desired.

For example, PTL 1 and PTL 2 disclose load converting pressure sensors including a semiconductor chip (beam member) made of, for example, Si on which a strain gauge including diffused resistors is formed. To increase the sensitivity of the sensor, only a displacement of a central portion of a diaphragm is transmitted to the semiconductor chip, and changes in the resistances of the diffused resistors due to the piezoresistive effect based on deformation of the semiconductor chip are detected.

More specifically, in the load converting pressure sensors according to the related art disclosed in PTL 1 and PTL 2, a central portion of the semiconductor chip is supported at a central portion of the diaphragm, and both ends of the semiconductor chip are fixed to portions that do not substantially move. For example, according to PTL 1, a strip-shaped semiconductor chip is supported at the center thereof by a rod-shaped member called a pivot at the center of a diaphragm. Both ends of the semiconductor chip in a long-side direction are fixed to a thick portion formed at the outer rim of the diaphragm with insulating pedestals interposed therebetween. According to PTL 2, the center of a rectangular semiconductor chip is fixed to the center of a diaphragm, and both ends of the semiconductor chip in the long-side direction are fixed to a base that does not move.

CITATION LIST

Patent Literature

PTL 1: Japanese Unexamined Patent Application Publication No. 2004-45140
PTL 2: Japanese Unexamined Patent Application Publication No. 63-217671

SUMMARY OF INVENTION

Technical Problem

In the pressure sensors disclosed in PTL 1 and PTL 2, the central portion of the semiconductor chip is supported at the center of the diaphragm, and both ends of the semiconductor chip in the long-side direction are fixed to portions of the diaphragm that do not substantially move. Accordingly, when the diaphragm is bent, a large displacement of the central portion of the diaphragm can be efficiently transmitted to the semiconductor chip. Accordingly, the sensitivity of the pressure sensor can be increased.

However, the above-described pressure sensors have a problem that the semiconductor chip is large. For example, in the pressure sensor disclosed in PTL 1, the thick portion is formed at the outer rim of the diaphragm, which is circular, and both ends of the strip-shaped semiconductor chip are fixed to the thick portion. Therefore, when, for example, the diameter of the coupling of the pressure sensor connected to a pipe is increased, the diameter of the diaphragm is also increased, and the length of the semiconductor chip needs to be increased by increasing the chip size accordingly.

The present invention has been made in light of the above-described problem, and an object of the present invention is to provide a high-sensitivity pressure sensor including a small semiconductor chip on which a strain gauge is formed.

Solution to Problem

A pressure sensor according to the present invention includes a diaphragm including a first principal surface and a second principal surface, the first principal surface receiving a pressure of a fluid that serves as a measurement object, the second principal surface being opposite to the first principal surface; a semiconductor chip having a rectangular shape and provided with resistors that constitute a strain gauge; and at least three support members made of an insulating material, each support member being fixed to the second principal surface at one end thereof and to the semiconductor chip at the other end thereof and extending perpendicularly to the second principal surface so as to support the semiconductor chip. One of the support members is provided at a center of the diaphragm in plan view. At least two of the other support members are provided in a region in which the diaphragm is deformed when a pressure greater than a pressure applied to the second principal surface is applied to the first principal surface. The at least two of the other support members are provided at positions point-symmetrical about the center of the diaphragm in plan view.

Advantageous Effects of Invention

Thus, the present invention provides a high-sensitivity pressure sensor including a small semiconductor chip on which a strain gauge is formed.

DESCRIPTION OF EMBODIMENTS

Figure 1:
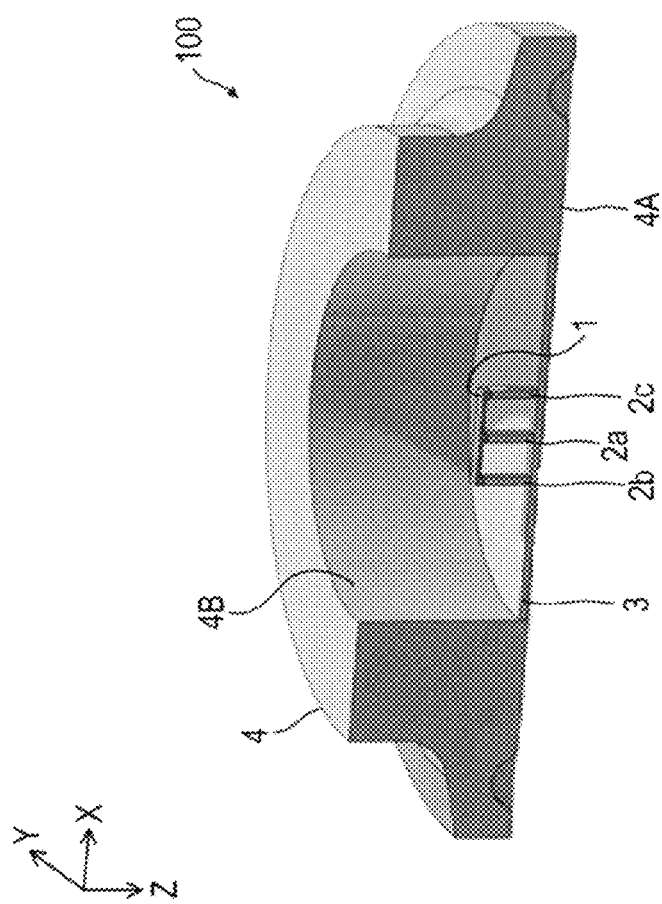
FIG. 1 is a sectional perspective view illustrating the structure of a pressure sensor according to an embodiment of the present invention.

First, the summary of a pressure sensor according to the present invention will be described.

A pressure sensor according to the present invention includes a diaphragm (3) including a first principal surface (3A) and a second principal surface (3B), the first principal surface receiving a pressure of a fluid that serves as a measurement object, the second principal surface being opposite to the first principal surface; a semiconductor chip (1) having a rectangular shape and provided with resistors (R1 to R4) that constitute a strain gauge; and at least three support members (2a, 2b, 2c) made of an insulating material, each support member being fixed to the second principal surface at one end thereof and to the semiconductor chip at the other end thereof and extending perpendicularly to the second principal surface so as to support the semiconductor chip. One of the support members (2a) is provided at a center (30) of the diaphragm in plan view. At least two of the other support members (2b, 2c) are provided in a region in which the diaphragm is deformed when a pressure greater than a pressure applied to the second principal surface is applied to the first principal surface. The at least two of the other support members are provided at positions point-symmetrical about the center of the diaphragm in plan view.

The above-described pressure sensor may further include a housing (4) having a tubular shape that contains the semiconductor chip, the support members, and the diaphragm. The diaphragm is fixed so as to cover an opening in one end portion (4A) of the housing, and the at least two of the other support members are provided at positions such that the least two of the other support members do not come into contact with an inner wall (4B) of the housing when the pressure greater than the pressure applied to the second principal surface is applied to the first principal surface.

In the above-described pressure sensor, the at least two of the other support members may be provided in a region (3D) in which an inclination of the second principal surface is greatest when the pressure greater than the pressure applied to the second principal surface is applied to the first principal surface and the diaphragm is deformed.

In the above-described pressure sensor, the resistors (R1 to R4) may be formed on the semiconductor chip in a region in which a tensile stress is generated in the semiconductor chip due to the support members when the pressure greater than the pressure applied to the second principal surface is applied to the first principal surface and the diaphragm is deformed, and the resistors may be arranged in a direction orthogonal to a direction connecting the at least two of the other support members in plan view.

In the above-described pressure sensor, the resistors may be formed on the semiconductor chip in a region in which a tensile stress is generated in the semiconductor chip when the pressure greater than the pressure applied to the second principal surface is applied to the first principal surface and the diaphragm is deformed. Among the resistors, the resistors that oppose each other in the bridge circuit (resistors R1 and R3 and resistors R2 and R4) may be formed at positions point-symmetrical about the center (11) of the semiconductor chip in plan view.

In the above description, components of the invention are given their corresponding reference numerals in the drawings in brackets for example.

Embodiments of the present invention will now be described with reference to the drawings. In the following description, components common to the embodiments are denoted by the same reference numerals, and redundant description of the components will be omitted.

<Overall Structure of Pressure Sensor>

Figure 2:
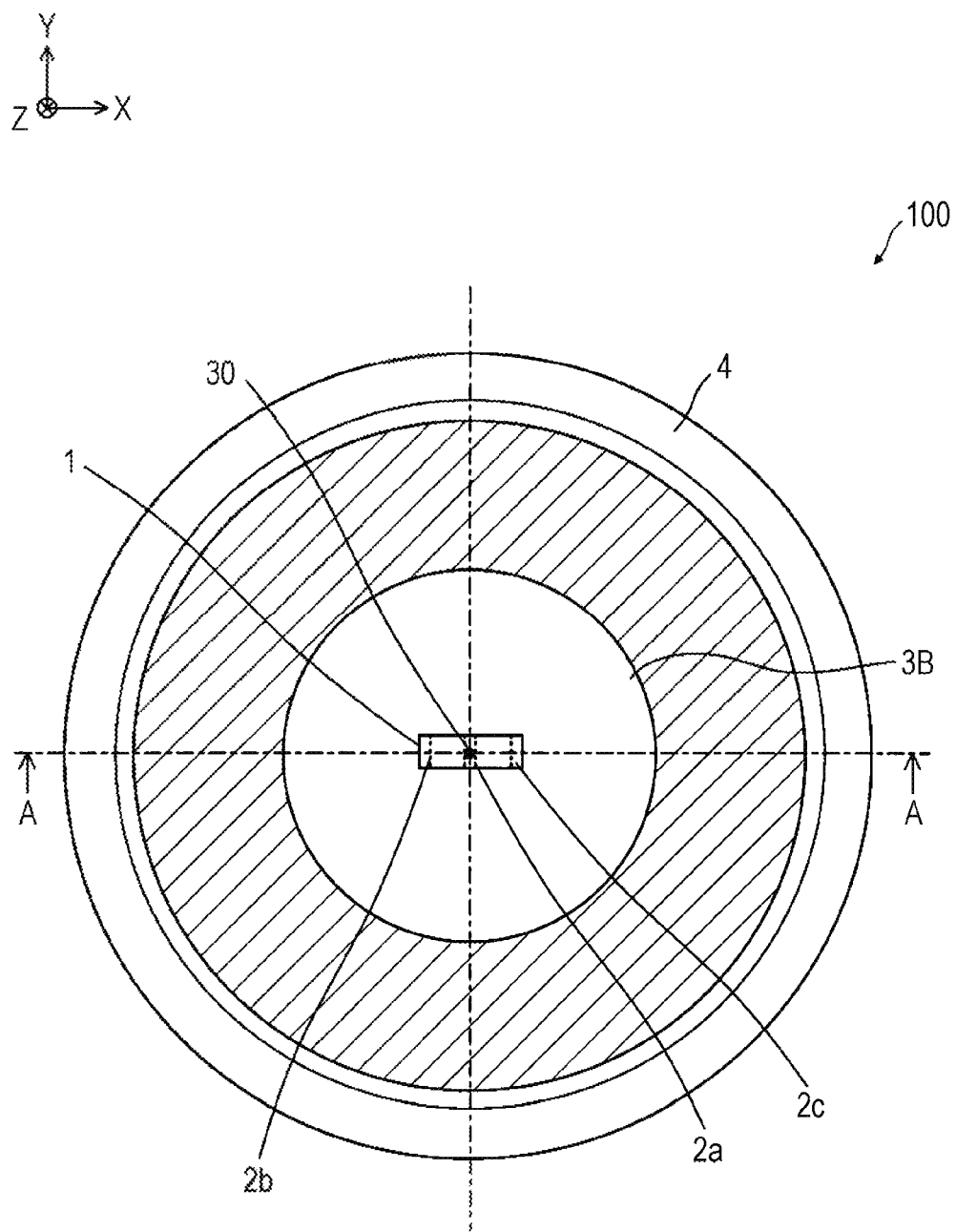
FIG. 2 is a plan view illustrating the structure of the pressure sensor according to the embodiment of the present invention.
Figure 3:
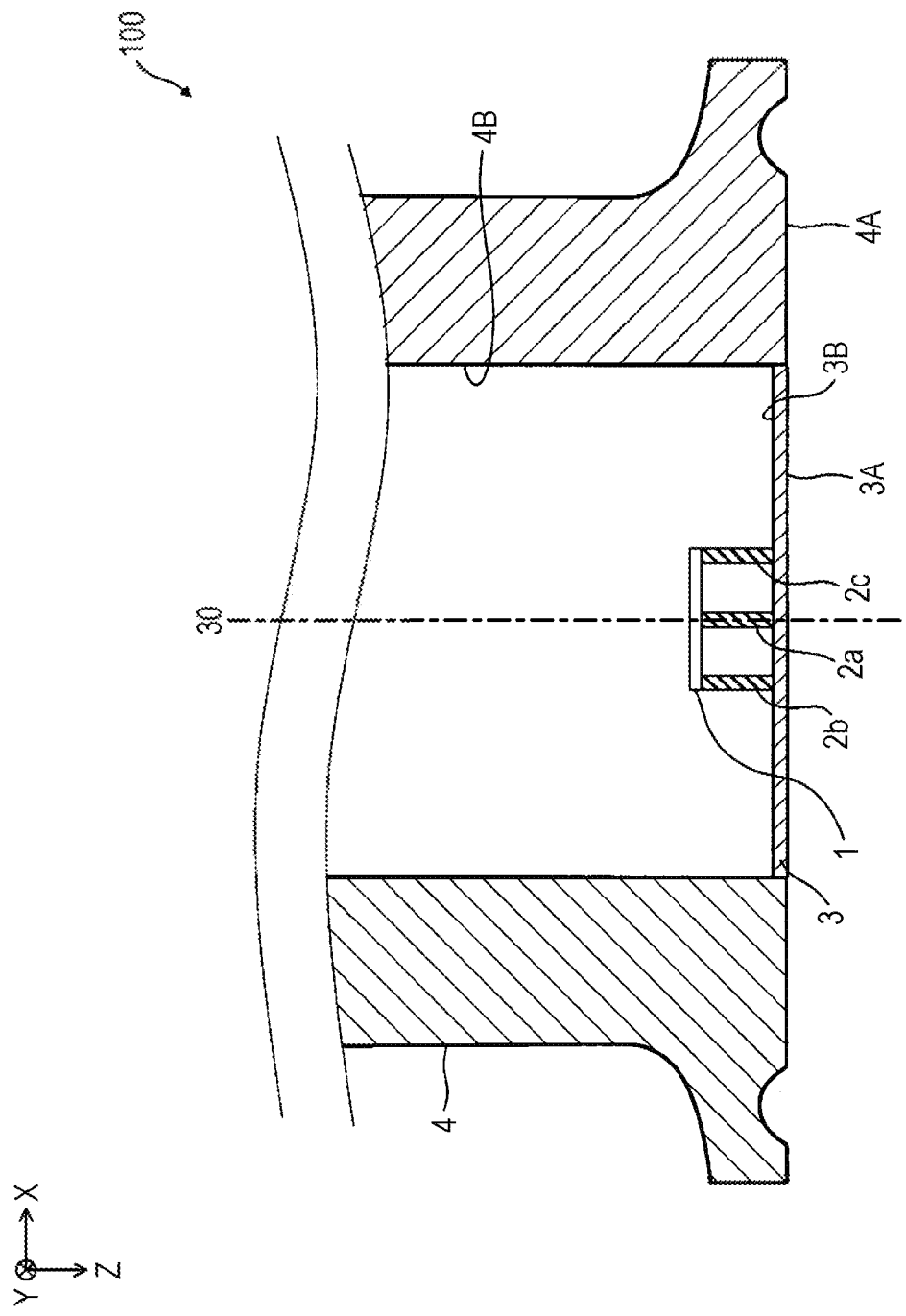
FIG. 3 is a sectional view illustrating the structure of the pressure sensor according to the embodiment of the present invention.

FIGS. 1 to 3 illustrate the structure of a pressure sensor according to an embodiment of the present invention.

FIG. 1 is a sectional perspective view illustrating the structure of a pressure sensor 100 according to the present embodiment. FIG. 2 is a plan view illustrating the structure of the pressure sensor 100 viewed in a Z direction in FIG. 1. FIG. 3 is a sectional view illustrating the structure of the pressure sensor 100 taken along line A-A in FIG. 2.

The pressure sensor 100 illustrated in FIGS. 1 to 3 is a device that detects a pressure of a fluid that serves as a measurement object by transmitting a displacement of a diaphragm that occurs when the diaphragm is bent by the pressure of the fluid to a semiconductor chip on which a strain gauge is formed. The pressure sensor 100 is structured so that the semiconductor chip is supported by at least three support members fixed to the diaphragm at positions at which the displacement occurs.

More specifically, the pressure sensor 100 includes a semiconductor chip 1, support members 2a to 2c, a diaphragm 3, and a housing 4. FIGS. 1 to 3 illustrate a mechanism for transmitting a deformation of the diaphragm 3 to the semiconductor chip 1 in the pressure sensor 100. Other functional units, such as a circuit for processing a signal output from the semiconductor chip 1, are omitted. The pressure sensor 100 may also include, for example, a display (for example, a liquid crystal display) for presenting various types of information, such as the detected pressure, to the user.

The semiconductor chip 1, the support members 2a to 2c, and the diaphragm 3 are contained in a housing 4 made of a highly corrosion-resistant metal material. As illustrated in FIGS. 1 to 3, the housing 4 has a tubular shape. One end portion 4A of the housing 4 has the shape of a coupling that enables connection to a pipe through which the fluid that serves as the measurement object flows. The inner space of the housing 4 is filled with, for example, air, and the pressure in the housing 4 at an inner wall 4B is, for example, atmospheric pressure.

The semiconductor chip 1 is constituted by a semiconductor substrate made of, for example, Si. The semiconductor chip 1 has a strain gauge that detects a deformation caused by stress applied to the semiconductor chip 1 based on variations in resistances.

Figure 4:
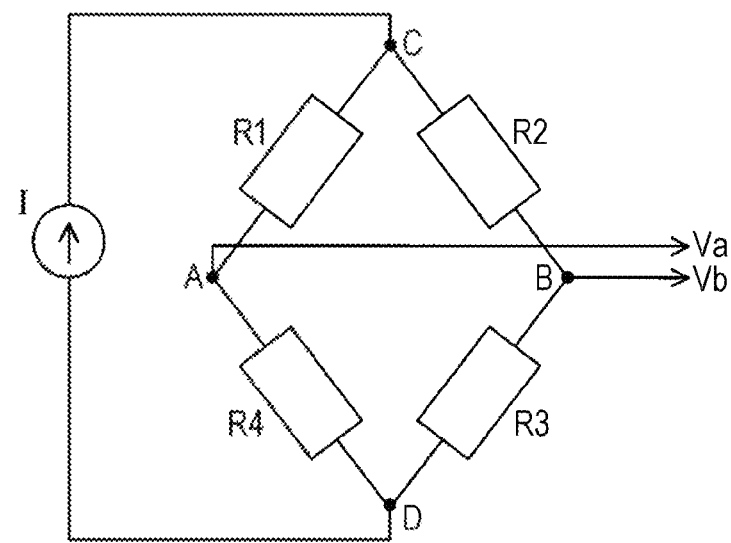
FIG. 4 is a diagram illustrating the structure of a bridge circuit.

As illustrated in FIG. 4, the strain gauge is constituted by, for example, a bridge circuit 10 including four resistors (for example, diffused resistors) R1 to R4 formed on the semiconductor chip 1. The positions at which the resistors R1 to R4 are formed on the semiconductor chip 1 will be described in detail below. The pressure sensor 100 is capable of measuring the pressure of the fluid that serves as the measurement object by detecting a change in voltage based on changes in the resistances of the resistors R1 to R4 caused by a stress generated in the semiconductor chip 1 while a constant current is applied to the bridge circuit 10.

A span voltage Vo output from the bridge circuit 10 can be expressed as in Equation (1) given below by using resistances R1 to R4. In Equation (1), VA and VB are voltages at nodes A and B in FIG. 4, and I is a current supplied from a constant current source.

[Equation 1]

$$Vo = VA - VB = \left( \frac{R1 \times R3 - R2 \times R4}{R1 + R2 + R3 + R4} \right) \times I \quad (1)$$

The diaphragm 3 is a film that receives the pressure of the fluid that serves as the measurement object. The diaphragm 3 is made of a highly corrosion-resistant material, such as a stainless steel (SUS) a ceramic, or titanium, and is, for example, circular in plan view. The diaphragm 3 supports the semiconductor chip 1 and the support members 2a, 2b, and 2c.

The diaphragm 3 is fixed to the end portion 4A of the housing 4 and covers an opening in the end portion 4A of the housing 4. For example, the outer rim of the diaphragm 3 is joined to the inner wall 4B of the end portion 4A of the housing 4 without leaving a gap therebetween. More specifically, the diaphragm 3 includes a pressure receiving surface (liquid contact surface) 3A that contacts the fluid that serves as the measurement object, and a support surface 3B that is opposite to the pressure receiving surface 3A and that supports the semiconductor chip 1 and the support members 2a, 2b, and 2c. The diaphragm 3 is bent when a pressure greater than the pressure applied to the support surface 3B (for example, atmospheric pressure) is applied to the pressure receiving surface 3A by the fluid that serves as the measurement object.

The support members 2a, 2b, and 2c (hereinafter may be referred to generically as "support members 2") are components that support the semiconductor chip 1 above the diaphragm 3. The support members 2 have the shape of a column, such as a polygonal column (for example, a rectangular column). The support members 2 are made of an electrically insulating material. More preferably, the support members 2 are made of an electrically insulating material with low thermal conductivity. The material of the support members 2 may be, for example, glass (for example, borosilicate glass (Pyrex (registered trademark))).

Each of the support members 2a, 2b, and 2c extends perpendicularly from the support surface 3B and supports the semi conductor chip 1. More specifically, each of the support members 2a, 2b, and 2c is fixed to the support surface 3B of the diaphragm 3 at one end thereof and is fixed to the semiconductor chip 1 at the other end thereof.

<Joining Structure of Support Members 2>

The joining structure in which the diaphragm 3, the support members 2, and the semiconductor chip 1 are joined together will now bee described in detail.

Figure 5:
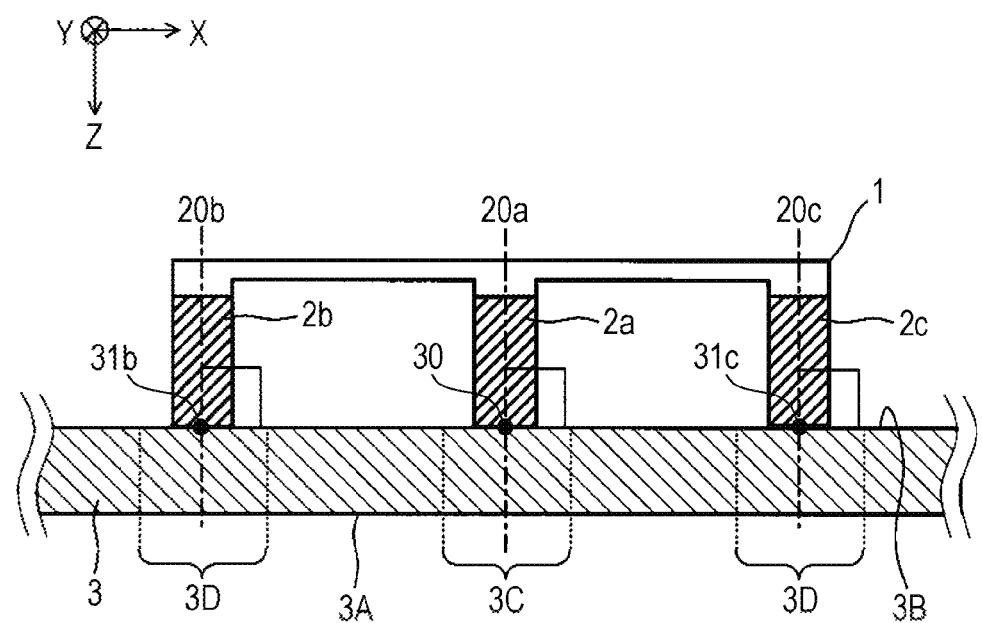
FIG. 5 is an enlarged view of a joining section in which a diaphragm, support members, and a semiconductor chip illustrated in FIG. 3 are joined together.

FIG. 5 is an enlarged view of a joining section in which the diaphragm 3, the support members 2, and the semi conductor chip 1 illustrated in FIG. 3 are joined together.

As illustrated in FIGS. 2 and 5, one end portion of the support member 2a is joined to a central portion of one principal surface of the semiconductor chip 1. One end portion of the support member 2b is joined to one side portion of the one principal surface of the semiconductor chip 1. One end portion of the support member 2c is joined to a side portion of the one principal surface of the semiconductor chip 1 that opposes the one side portion.

FIG. 5 illustrates an example in which joining portions of the semiconductor chip 1 that are joined to the support members 2 are thicker than other portions of the semiconductor chip 1 in the Z direction. However, the joining portions may have the same thickness as that of the other portions.

The other end portion of each of the support members 2a to 2c is fixed to the support surface 3B of the diaphragm 3. More specifically, as illustrated in FIGS. 2 and 5, the support members 2a to 2c are fixed to the support surface 3B so that central axes 20a, 20b, and 20c of the support members 2a to 2c are substantially perpendicular to the support surface 3B (X-Y plane) of the diaphragm 3.

The support members 2a to 2c are fixed to the support surface 3B of the diaphragm 3 at positions described below.

(1) Support Member 2a

The support member 2a is provided on the support surface 3B at a center 30 of the diaphragm 3. More specifically, the support member 2a is fixed to the support surface 3B of the diaphragm 3 so that the center of the bottom surface of the support member 2a coincides with the center 30 of the diaphragm 3 in plan view.

The center 30 of the diaphragm 3 is the point where the displacement of the diaphragm 3 in a Z-axis direction is greatest when a pressure greater than the pressure applied to the support surface 3B is applied to the pressure receiving surface 3A. For example, when the diaphragm 3 is circular in plan view, the center 30 is the central point of the diaphragm 3 (circle).

As described above, the support member 2a is preferably fisted to the support surface 3B of the diaphragm 3 so that the center of the bottom surface of the support me caber 2a coincides with the center 30 of the diaphragm 3. However, the center of the bottom surface of the support member 2a may be somewhat displaced from the center 30 of the diaphragm 3 as long as, for example, the center of the bottom surface of the support member 2a is in a region 3C within a circle centered on the point 30.

(2) Support Members 2b and 2c

The support members 2b and 2c are provided at positions point-symmetrical about the center 30 of the diaphragm 3 (support member 2a) in plan view in a region in which the diaphragm 3 is deformed when a pressure greater than the pressure applied to the support surface 3B is applied to the pressure receiving surface 3A.

In other words, the support members 2b and 2c are each fixed to the support surface 3B at one end thereof at positions that are point-symmetrical about the center 30 of the diaphragm 3 in plan view and at which the support members 2b and 2c are tilted with respect to the Z-axis when a pressure greater than the pressure applied to the support surface 3B is applied to the pressure receiving surface 3A.

Preferably, the support members 3b and 2c are provided at positions such that the support members 2b and 2c are tilted with respect to the Z-axis without coming into contact with the inner wall 4B of the housing 4 when a pressure greater than the pressure applied to the support surface 3B is applied to the pressure receiving surface 3A and the diaphragm 3 is deformed.

More preferably, the support members 2b and 2c are provided at positions at which the inclination (gradient) of the support surface 3B of the diaphragm 3 is greatest when a pressure greater than the pressure applied to the support surface 3B is applied to the pressure receiving surface 3A and the diaphragm 3 is deformed.

Figure 7:
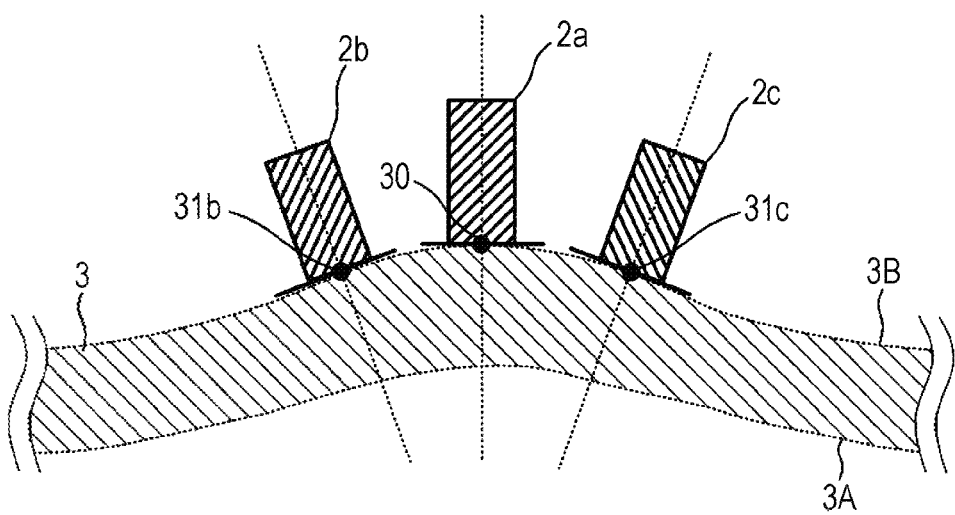
FIG. 7 is a schematic diagram illustrating displacements of the support members when the diaphragm is deformed.

As illustrated in FIG. 7, the positions at which the inclination of the support surface 3B of the diaphragm 3 is greatest are the positions (points 31b and 31c) at which the inclination of the support surface 3B of the diaphragm 3 is greatest when a pressure greater than the pressure applied to the support surface 3B is applied to the pressure receiving surface 3A and the diaphragm 3 is bent.

Figure 6:
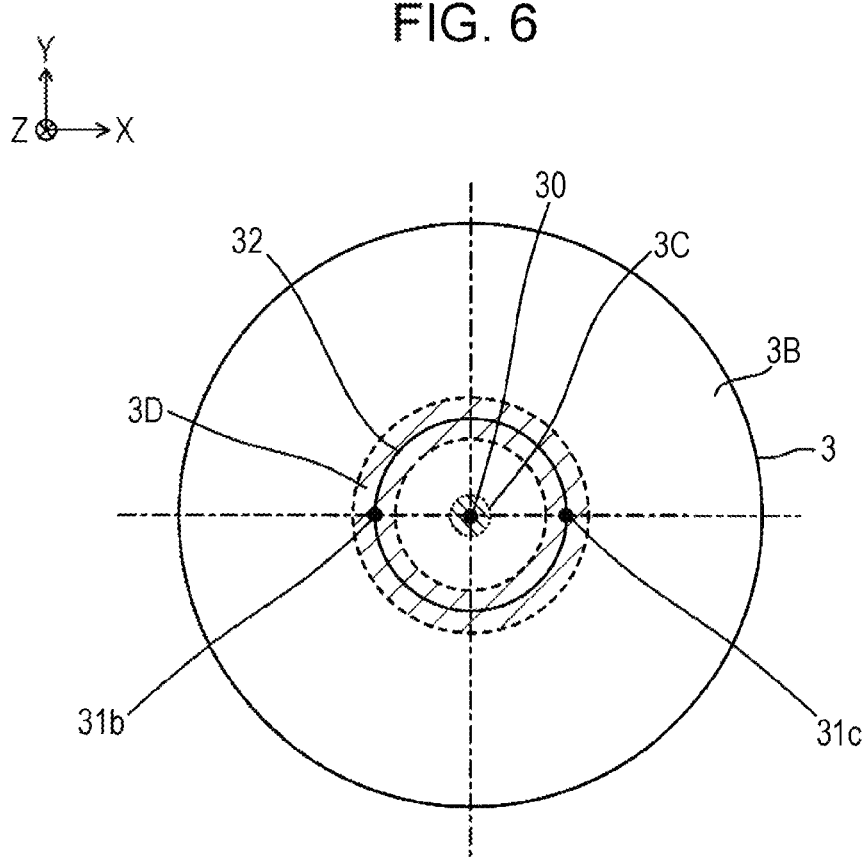
FIG. 6 is a plan view illustrating a support surface of the diaphragm.

As illustrated in FIG. 6, the points at which the inclination of the diaphragm 3 is greatest (for example, points 31b and 31c) form a circle 32 centered on the center 30 of the diaphragm 3. Accordingly, by fixing the support members 2b and 2c so that the centers of the bottom surfaces thereof coincide with two points on the circle 32 that are point-symmetrical about the center 30, the displacement of the diaphragm 3 can be most efficiently transmitted to the semiconductor chip 1, and the sensitivity of the pressure sensor 100 can be maximized.

As described above, when the sensitivity of the sensor is to be maximized, the support members 2b and 2c are preferably provided at the points where the inclination of the diaphragm 3 is greatest. However, the support members 2b and 2c may each be fixed at one thereof at positions determined as appropriate in consideration of the desired sensitivity of the sensor and the chip size of the semiconductor chip 1. For example, as illustrated in FIG. 6, the support members 2b and 2c may each be fixed at one end thereof at positions within a region 3D including the circle 32 drawn by connecting the points at which the inclination of the diaphragm 3 is greatest (hereinafter referred to as "region in which the inclination of the diaphragm 3 is greatest"). Examples of such positions will now be described.

Figure 8:
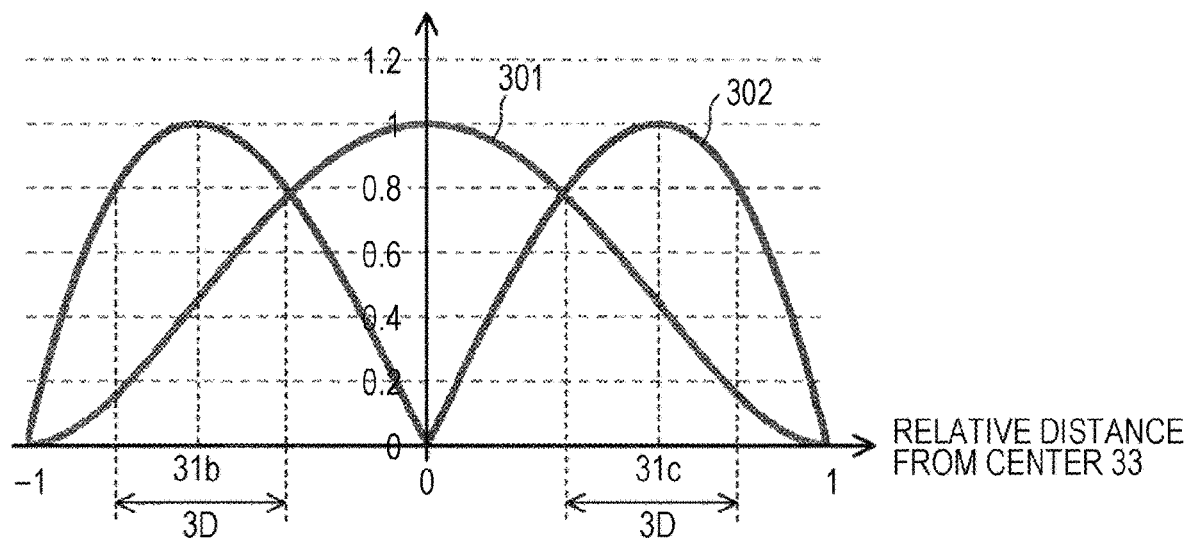
FIG. 8 is a graph of displacement of the diaphragm and inclination of the support surface versus radial position on the diaphragm.

FIG. 8 is a graph of displacement of the diaphragm and inclination of the support surface versus radial position on the diaphragm. In FIG. 8, the horizontal axis represents the relative distance from the center of the diaphragm 3 when the radius of the diaphragm 3 is "1". The vertical axis represents the relative displacement of the diaphragm 3 when the maximum displacement is "1" and the relative inclination of the diaphragm 3 when the maximum inclination is "1". In FIG. 8, reference numeral 301 denotes the displacement of the diaphragm 3 versus relative distance from the center of the diaphragm 3, and reference numeral 302 denotes the inclination of the support surface 3B of the diaphragm 3 versus relative distance from the center of the diaphragm 3.

FIG. 8 shows that the inclination of the diaphragm 3 is greatest at points 31b and 31c on the diaphragm 3. The inclination is 80% of more of the maximum inclination when the relative distance from the center of the diaphragm 3 is in the range of "0.35 to 0.77". Accordingly, the sensitivity of the sensor can be increased by, for example, defining this range as the region 3D in which the inclination of the diaphragm 3 is greatest and fixing each of the support members 2b and 2c at one end thereof so that the centers of the bottom surfaces of the support members 2b and 2c are within this region 3D.

In particular, when the support members 2b and 2c are disposed in a region within the circle 32 in the region 3D in which the inclination of the support surface 3B of the diaphragm 3 is greatest (for example, in the region in which the relative distance is in the range of "0.35 to 0.50"), the size of the semiconductor chip 1 in the long-side direction can be further reduced.

Thus, by appropriately setting the positions at which the support members 2b and 2c are fixed in the region 3D of the diaphragm 3, the size of the semiconductor chip 1 can be further reduced without reducing the sensitivity of the sensor.

<Principle of Operation of Pressure Sensor 100>

Figure 9:
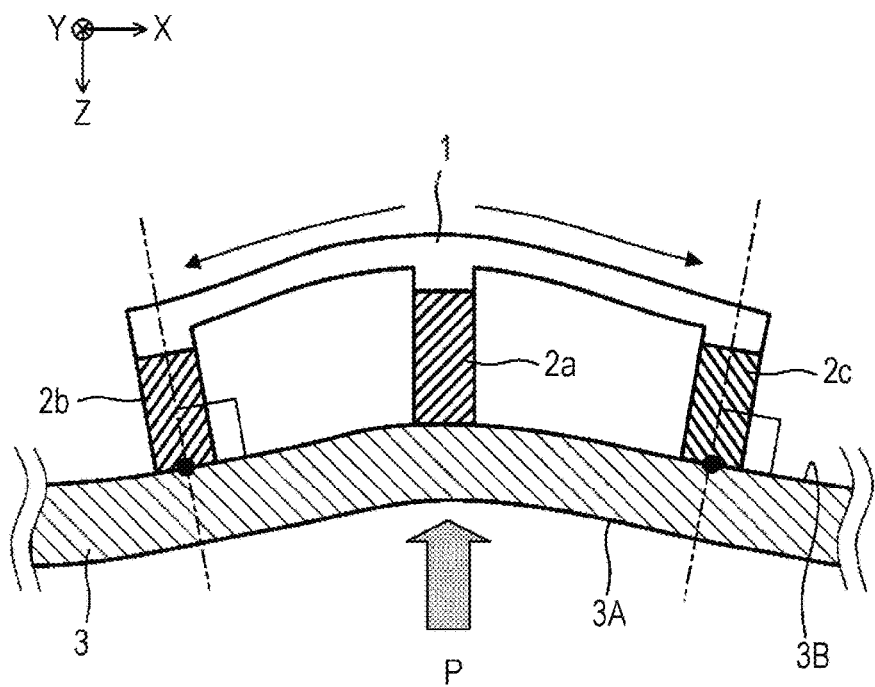
FIG. 9 is a schematic diagram illustrating displacements of the support members and the semiconductor chip when the diaphragm is deformed.

FIG. 9 is a schematic diagram illustrating displacements of the support members 2 and the semiconductor chip 1 when the diaphragm 3 is deformed.

Referring to FIG. 9, the diaphragm 3 is bent when a pressure greater than the pressure applied to the support surface 3B is applied to the pressure receiving surface 3A of the diaphragm 3. Since one end of the support member 2a is fixed to the diaphragm 3 at the center 30, the other end of the support member 2a is moved by a large amount in the Z-axis direction but is hardly moved in an X-axis direction and a Y-axis direction. In contrast, the support members 2a and 2b are fixed so as to extend substantially perpendicularly from the support surface 3B of the diaphragm 3 at positions apart from the center 30 of the support surface 3B, and are therefore tilted with respect to the Z-axis. In other words, the other ends of the support members 2b and 2c are moved not only in the Z-axis direction but also in the x-axis direction. More specifically, the support members 2b and 2c are tilted so that the other ends thereof move away from the center 30 of the diaphragm 3 (support member 2a), that is, toward the inner walls 4B of the housing 4.

Accordingly, the semiconductor chip 1 is stretched, and a tensile stress is generated in the semiconductor chip 1. More specifically, a tensile stress corresponding to the differences in displacements in the X-axis direction and the Y-axis direction between the support members 2a and 2b is generated in the semiconductor chip 1. Accordingly, the pressure of the fluid that serves as the measurement object can be accurately detected by appropriately forming the resistors R1 to R4 that constitute the above-described strain gauge (bridge circuit) in the region where the above-described tensile stress is generated in the semiconductor chip 1.

<Arrangement of Resistors R1 to R4>

The arrangement of the resistors R1 to R4 formed on the semiconductor chip 1 will now be described.

Figure 10:
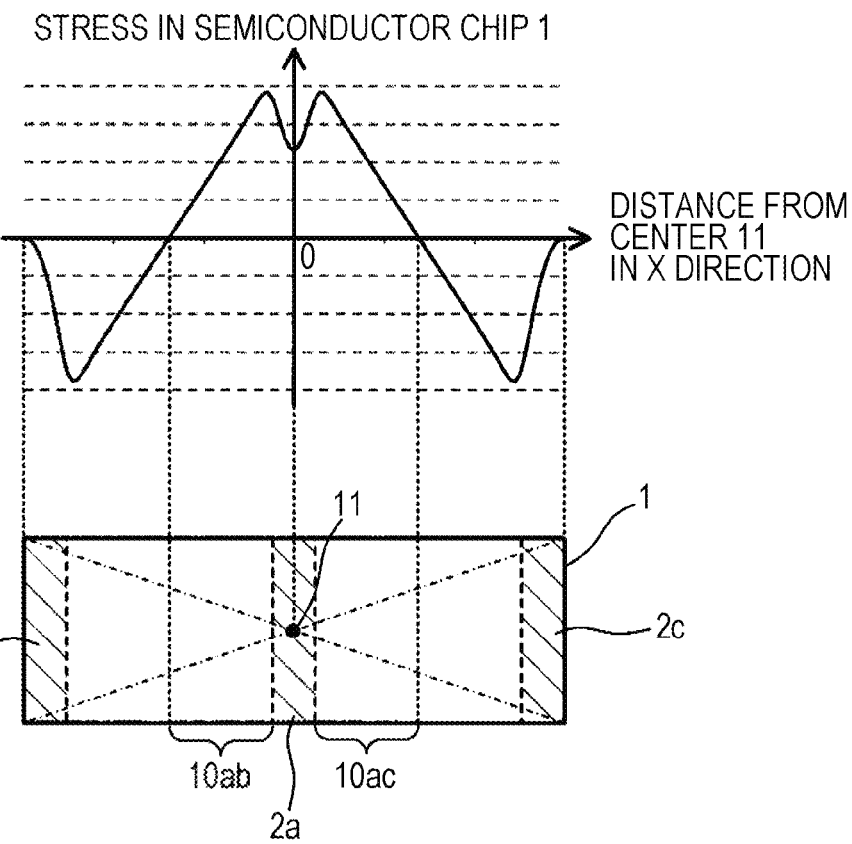
FIG. 10 is a diagram illustrating regions in which a plurality of resistors are formed on the semiconductor chip.

FIG. 10 is a diagram illustrating regions in which the resistors R1 to R4 are formed on the semiconductor chip 1. A plan view of the semiconductor chip 1 is shown in the lower part of FIG. 10. The graph shown in the upper part of FIG. 10 has a horizontal axis representing the distance in the X-axis direction corresponding to that in the plan view of the semiconductor chip 1 shown in the lower part of FIG. 10, and a vertical axis representing the stress generated in the semiconductor chip 1 when the diaphragm 3 is bent.

Referring to FIG. 10, the resistors R1 to R4 are formed in regions in which a positive (+) stress is generated in the semiconductor chip 1 when the diaphragm 3 is bent by the pressure of the fluid, that is, in regions 10ab and 10ac in which a tensile stress is generated in the semiconductor chip 1.

The locations, for example, of the resistors R1 to R4 in the regions 10ab and 10ac are not particularly limited. For example, the resistors R1 to R4 are preferably arranged as illustrated in FIGS. 11 and 12.

Figure 11:
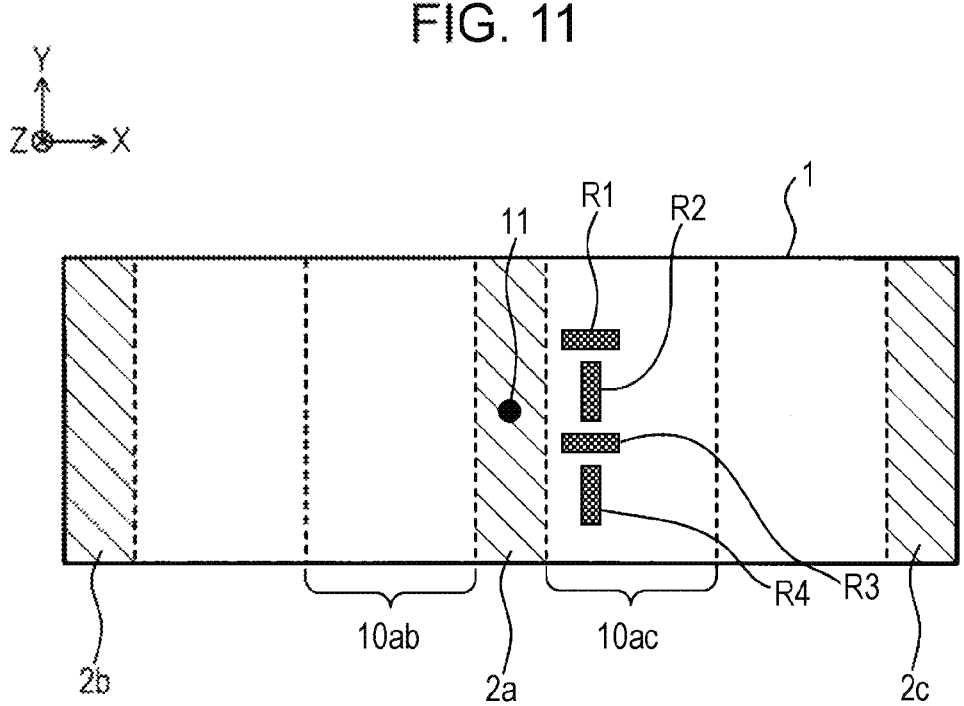
FIG. 11 is a diagram illustrating a first example of an arrangement of the resistors on the semiconductor chip.

As illustrated in FIG. 11, the resistors R1 to R4 may be arranged in a direction (Y-axis direction) orthogonal to the direction connecting the two support members 2b and 2c in plan view in the regions in which the tensile stress is generated in the semiconductor chip 1 due to the support members 2 when a pressure greater than the pressure applied to the support surface 3B is applied to the pressure receiving surface 3A and the diaphragm 3 is deformed. More specifically, the resistors R1 to R4 may be arranged in a short-side direction of the semiconductor chip in one of the regions 10ab and 10ac of the semiconductor chip 1.

Figure 12:
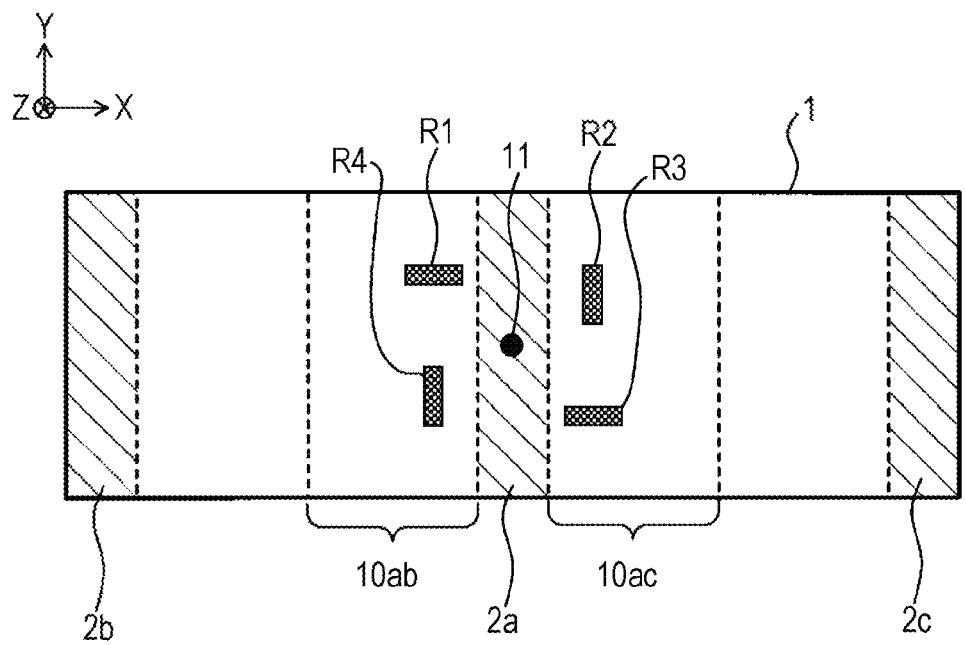
FIG. 12 is a diagram illustrating a second example of an arrangement of the resistors on the semiconductor chip.

Alternatively, as illustrated in FIG. 12, among the resistors R1 to R4, the resistors that oppose each other in the bridge circuit 10 may be formed at positions point-symmetrical about the center 11 of the semiconductor chip 1 in plan view. More specifically, the resistors R1 and R3 may be arranged point-symmetrically about the center 11 of the semiconductor chip 1 in plan view. Also, the resistors R2 and R4 may be arranged point-symmetrically about the center 11 of the semiconductor chip 1 in plan view.

Figure 13:
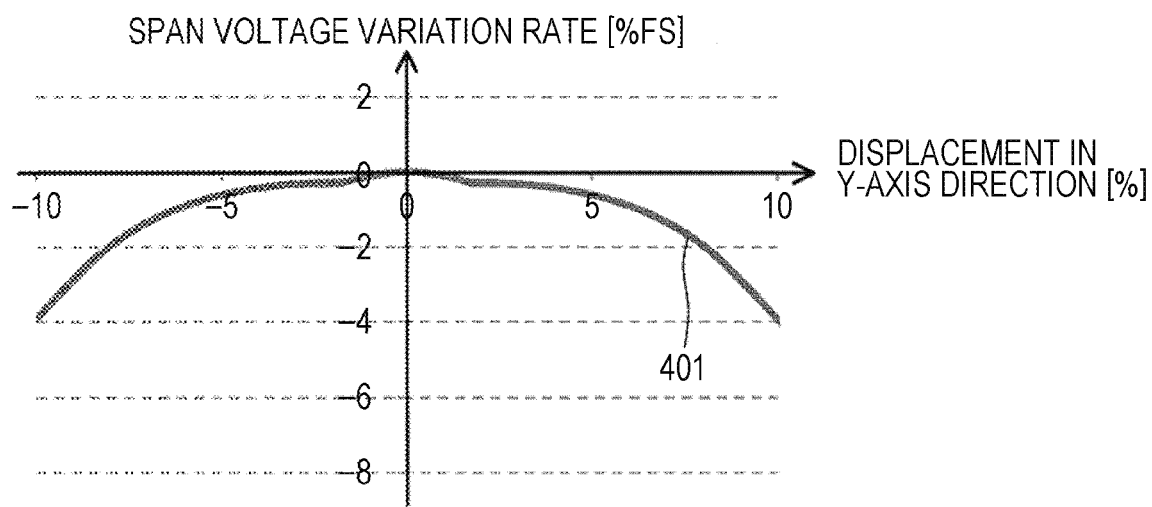
FIG. 13 is a graph of variation rate of a span voltage of a bridge circuit versus displacement of the semiconductor chip in a Y-axis direction.

FIG. 13 shows the result of a simulation of variation in the span voltage of the bridge circuit versus displacement of the semiconductor chip 1 relative to the diaphragm 3 in the Y-axis direction in the case where the resistors R1 to R4 are arranged as illustrated in FIG. 11.

In FIG. 13, the horizontal axis represents the percentage of the displacement of the semiconductor chip 1 relative to the diameter of the diaphragm 3, and the vertical axis represents the variation rate [% FS] of the span voltage of the bridge circuit including the resistors R1 to R4.

As is clear from FIG. 13, when the resistors R1 to R4 are arranged on the semiconductor chip 1 as illustrated in FIG. 11, the variation in the span voltage can be set to 1% FS or less by controlling the displacement of the semiconductor chip 1 in the short-side direction (Y-axis direction) relative to the diameter of the diaphragm 3 within the range of ±5%.

Therefore, by forming the resistors R1 to R4 on the semiconductor chip 1 as described above, the allowance for the displacement of the semiconductor chip 1 relative to the diaphragm 3 in the Y-axis direction can be increased. This effect can also be obtained when the resistors that oppose each other in the bridge circuit 10 are formed at positions point-symmetrical about the center 12 of the semiconductor chip 1 (see FIG. 12).

When the resistors that oppose each other in the bridge circuit 10 are formed at positions point-symmetrical about the center 11 of the semiconductor chip 1 as illustrated in FIG. 12, the influence of displacement of the semiconductor chip 1 relative to the diaphragm 3 in the X-axis direction can be reduced.

Figure 14:
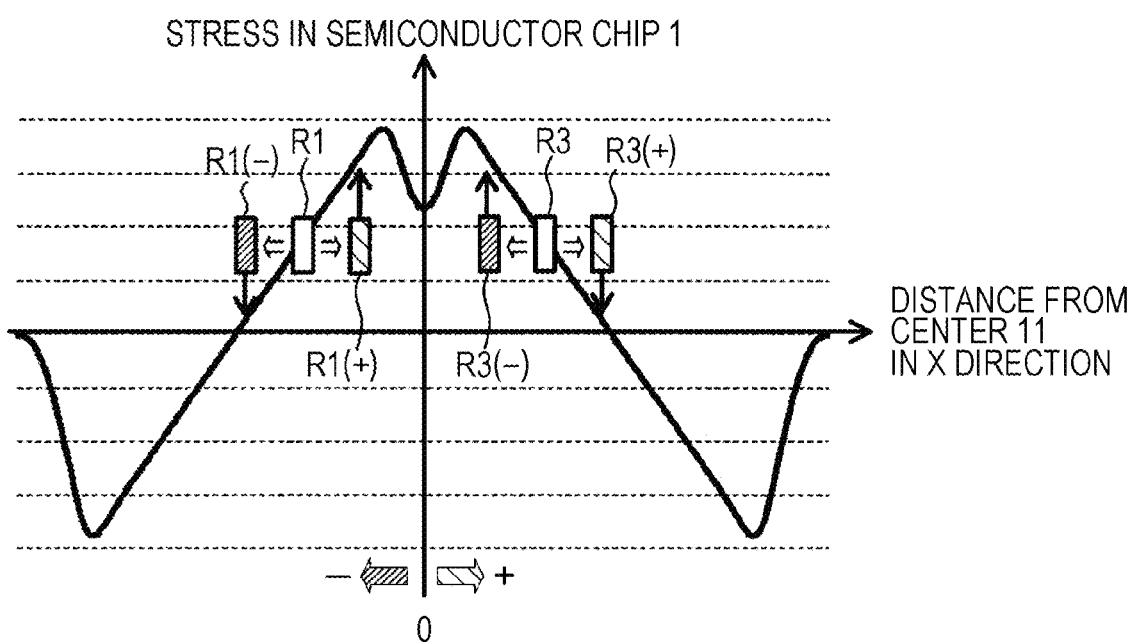
FIG. 14 is a graph showing changes in stresses applied to the resistors with respect to displacement of the semiconductor chip in an X-axis direction.

FIG. 14 is a graph of the variation rate of the span voltage of the bridge circuit versus displacement of the semiconductor chip in the Y-axis direction. FIG. 14 illustrates the result of a simulation of the stress distribution in the semiconductor chip 1 generated when the pressure is applied to the semiconductor chip 1 on which the resistors R1 to R4 are arranged as illustrated in FIG. 12. In FIG. 14, the horizontal axis represents the position in the X-axis direction when the center 30 of the diaphragm 3 is at the origin, and the vertical axis represents the stress generated in the semiconductor chip 1.

As is clear from FIG. 14, assuming that the resistors that oppose each other in the bridge circuit 10 (resistors R1 and R3 and resistors R2 and R4) are arranged point-symmetrically about the center 11 of the semiconductor chip 1, the opposing resistors receive equal stress when the center 11 of the semiconductor chip 1 and the center 30 of the diaphragm 3 coincide with each other. When the center 11 of the semiconductor chip 1 is displaced from the center 30 of the diaphragm 3 in a positive or negative direction along the X-axis, the stress applied to one of the opposing resistors decreases, and the stress applied to the other resistor increases. For example, as illustrated in FIG. 14, when the semiconductor chip 1 is shifted in the positive direction along the X-axis, the stress applied to the resistor R1 increases and the stress applied to the resistor R3 decreases. Similarly, the stress applied to the resistor R4 increases and the stress applied to the resistor R2 decreases.

Thus, when the semiconductor chip 1 is displaced relative to the center 30 of the diaphragm 3 along the X-axis, the stresses applied to be opposing resistors change in opposite directions. Therefore, the changes in the resistances of the resistors R1 to R4 cancel each other in the above-described Equation (1) expressing the span voltage Vo.

Accordingly, when the resistors that oppose each other in the bridge circuit 10, that is, the resistors R1 and R3 and the resistors R2 and R4, are arranged point-symmetrically about the center 11 of the semiconductor chip 1, the influence of the displacement of the semiconductor chip 1 relative to the diaphragm 3 in the X-axis direction on the span voltage Vo of the bridge circuit 100 can be reduced.

<Effects of Pressure Sensor 100>

As described above, the pressure sensor according to the present invention is structured such that the semiconductor chip on which the strain gauge is formed is supported by the support member 2a and the two support members 2b and 2c. The support member 2a is fixed to the support surface 3B so as to extend substantially perpendicularly therefrom at the center 30 of the diaphragm 3. The two support members 2b and 2c are fixed to the support surface 3B so as to extend substantially perpendicularly therefrom at positions point-symmetrical about the center 30 of the diaphragm in the region in which the diaphragm 3 is deformed. With this structure, when the diaphragm 3 is bent, the support members 2b and 2c arranged on both sides of the support member 2a are tilted outward so that the tensile stress corresponding to the displacement of the diaphragm 3 can be efficiently generated in the semiconductor chip 1.

In the pressure sensor 100, the support members 2b and 2c that support both end portions of the semiconductor chip are fixed in the region in which the diaphragm 3 is deformed. Therefore, the chip size of the semiconductor chip can be reduced from that in the case where the support members 2b and 2c are fixed at positions at which substantially no movement occurs, that is, at positions outside the region in which the diaphragm 3 is deformed, as in the load converting pressure sensors according to the related art.

As described above, according to the pressure sensor 100 of the present invention, the size of the semiconductor chip can be reduced and the sensitivity can be increased at the same time.

In the pressure sensor 100, the support members 2b and 2c are fixed at positions such that the support members 2b and 2c are tilted with respect to the Z-axis without coming into contact with the inner wall 4B of the housing 4 when the diaphragm 3 is bent by the pressure applied by the fluid. Thus, the tilting of the support members 2b and 2c is not restricted by the inner wall 4B of the housing 4, and the detectable pressure range of the pressure sensor 100 can be increased accordingly.

When the support members 2b and 2c are fixed at the points 31b and 31b where the inclination of the diaphragm 3 is greatest, the sensitivity of the sensor can be further increased as described above. When the support members 2b and 2c are fixed in the region 3D in which the inclination of the diaphragm 3 is greatest, the size of the semiconductor chip can be further reduced while the sensitivity of the sensor can be maintained at a high level as described above.

As illustrated in FIG. 11, the resistors R1 to R4 that constitute the bridge circuit 100 may be arranged in the short-side direction of the semiconductor chip 1 in the region in which the tensile stress is generated in the semiconductor chip 1. In such a case, as described above, the allowance for the displacement of the semiconductor chip 1 relative to the diaphragm 3 in the short-side direction can be increased. Accordingly, the sensitivity of the pressure sensor 100 can be increased.

The resistors that oppose each other in the bridge circuit 10 may be formed at positions point-symmetrical about the center 11 of the semiconductor chip 1 in the region in which the tensile stress is generated in the semiconductor chip 1 (see FIG. 12). In such a case, as described above, not only can the allowance for the displacement of the semiconductor chip X relative to the diaphragm 3 in the Y-axis direction be increased, but the influence of the displacement of the semiconductor chip 1 relative to the diaphragm 3 in the X-axis direction can be reduced. Accordingly, the sensitivity of the pressure sensor 100 can be further increased.

Although the invention made by the present inventors is described in detail based on the embodiment, the present invention is not limited to this, and may, of course, be modified in various ways without departing from the gist thereof.

For example, in the above-described embodiment, the support members 2 have the shape of a polygonal column. However, the support members 2 may instead have the shape of, for example, a circular column.

INDUSTRIAL APPLICABILITY

The pressure sensor according to the present invention may be used as various types of sensors, such as a sanitary pressure sensor.

REFERENCE SIGNS LIST

100: pressure sensor, 1 semiconductor chip, 2, 2a, 2b, 2c support member, 3 diaphragm, 3A pressure receiving surface, 3B support surface, 3C central region, 3D region in which inclination of diaphragm is greatest, 30 center of diaphragm, 31b, 31c point where inclination of diaphragm is greatest, 32 circle, 4 housing, 4A end portion of housing, 4B inner wall of housing, 10 bridge circuit, R1 to R4 resistor, 10ab, 10ac region.

The invention claimed is:

1. A pressure sensor, comprising:
a diaphragm having a uniform thickness between a first principal surface and a second principal surface, the first principal surface receiving a pressure of a fluid that serves as a measurement object, the second principal surface being opposite to the first principal surface;
a semiconductor chip having a rectangular shape and provided with resistors that constitute a strain gauge; and
at least three separate and distinct support members made of an insulating material, each support member being fixed to the second principal surface at one end thereof and to the semiconductor chip at the other end thereof and extending perpendicularly to the second principal surface so as to support the semiconductor chip,
wherein a first support member of the at least three support members is provided at a center of the diaphragm in plan view,
wherein a second support member and a third support member of the at least three support members are provided on opposite sides of the first support member in regions in which the diaphragm is deformed when a pressure greater than a pressure applied to the second principal surface is applied to the first principal surface, and
wherein the second and third support members are provided at positions point-symmetrical about the center of the diaphragm in plan view.

2. The pressure sensor according to claim 1, further comprising:
a housing having a tubular shape that contains the semiconductor chip, the support members, and the diaphragm,
wherein the diaphragm is fixed so as to cover an opening in one end portion of the housing, and
wherein the second and third support members are provided at positions such that the second and third support members do not come into contact with an inner wall of the housing when the pressure greater than the pressure applied to the second principal surface is applied to the first principal surface and the diaphragm is deformed.

3. The pressure sensor according to claim 1,
wherein the second and third support members are provided in regions in which an inclination of the second principal surface is greatest when the pressure greater than the pressure applied to the second principal surface is applied to the first principal surface and the diaphragm is deformed.

4. The pressure sensor according to claim 1,
wherein the resistors are formed on the semiconductor chip in a region in which a tensile stress is generated in the semiconductor chip due to the support members, when the pressure greater than the pressure applied to the second principal surface is applied to the first principal surface and the diaphragm is deformed, and
wherein the resistors are arranged on the semiconductor chip in a direction orthogonal to a direction connecting the second and third support members in plan view.

5. The pressure sensor according to claim 1,
wherein the resistors are formed on the semiconductor chip in a region in which a tensile stress is generated in the semiconductor chip due to the support members when the pressure greater than the pressure applied to the second principal surface is applied to the first principal surface and the diaphragm is deformed, and
wherein, among the resistors, the resistors that oppose each other in a bridge circuit are formed at positions point-symmetrical about the center of the semiconductor chip in plan view.

6. The pressure sensor of claim 1, wherein each of the first, second, and third support members are columns separated from one another.

7. The pressure sensor of claim 1, wherein each of the first, second, and third support members have a same length in a direction perpendicular to the second principal surface and extending from the diaphragm to the semiconductor chip.

* * * * *